UNITED STATES PATENT OFFICE.

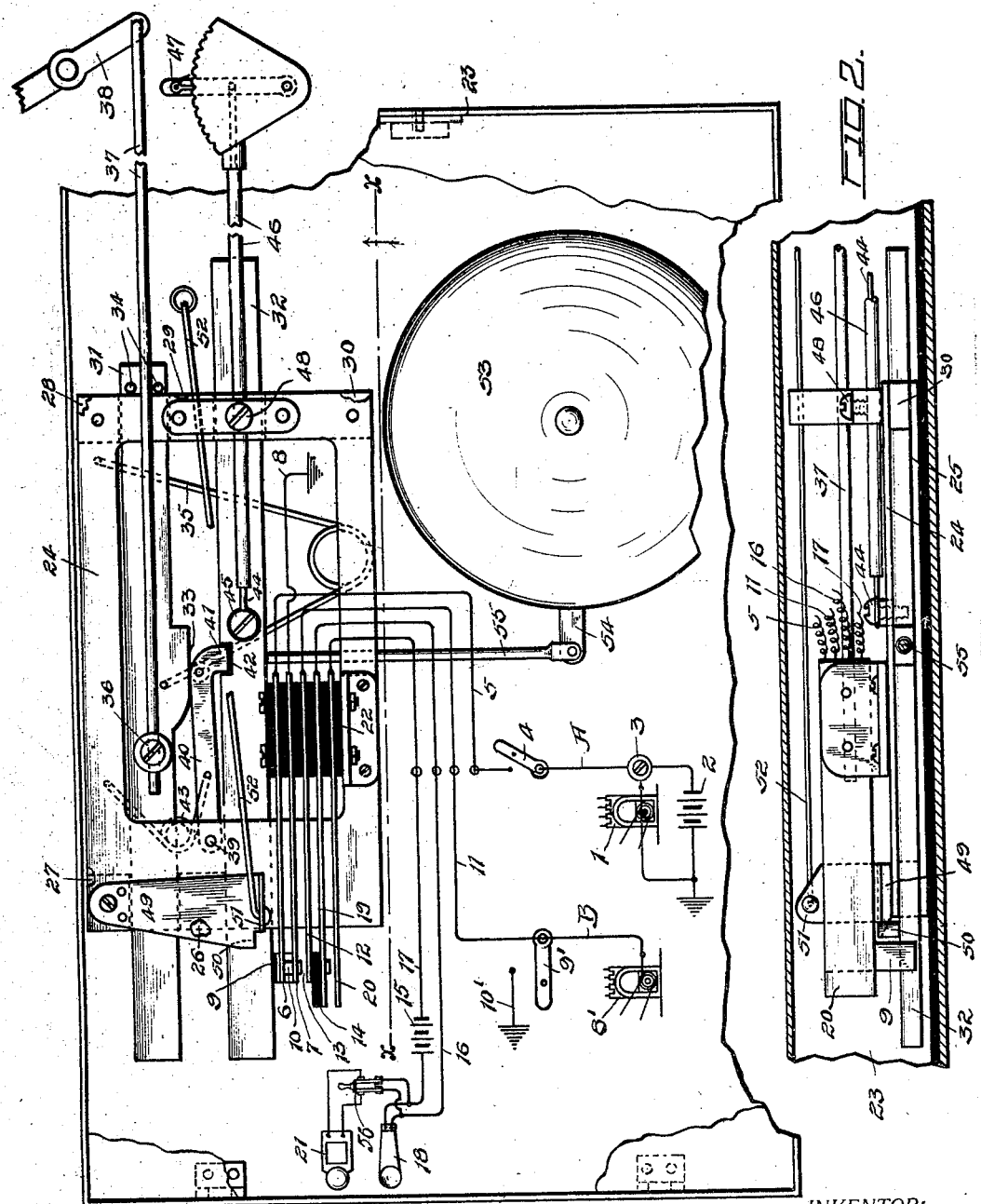

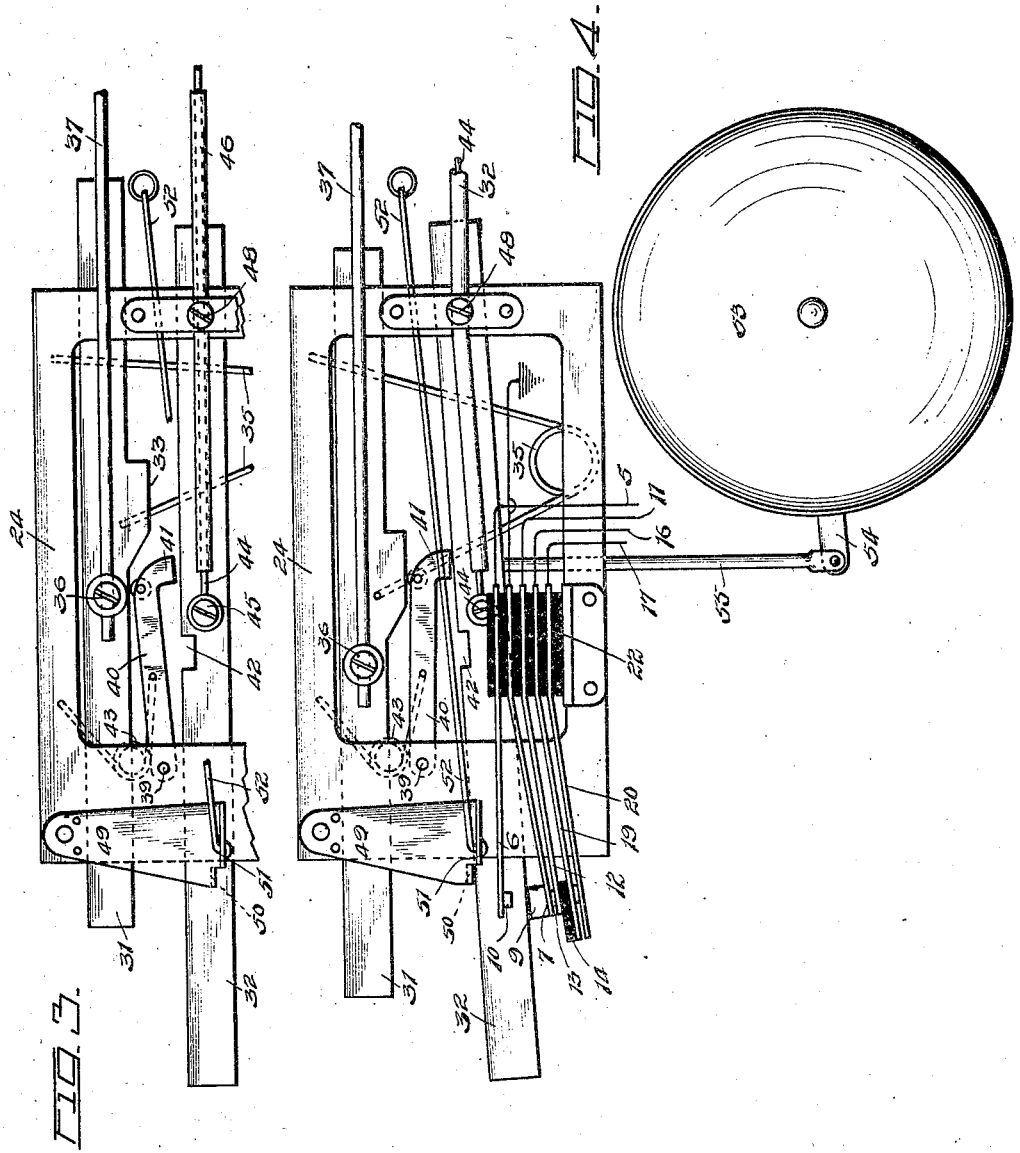

WILLIAM H. HANSSEN, OF DENVER, COLORADO, ASSIGNOR, BY MESNE ASSIGNMENTS, TO V. J. SCHOLTZ, OF DENVER, COLORADO.

AUTOMOBILE-THIEF ALARM.

1,220,627.  Specification of Letters Patent.  Patented Mar. 27, 1917.

Application filed September 27, 1915. Serial No. 52,762.

*To all whom it may concern:*

Be it known that I, WILLIAM H. HANSSEN, a citizen of the United States, residing at Denver, in the county of Denver and State of Colorado, have invented a new and useful Automobile-Thief Alarm, of which the following is a specification in such clear terms as will enable those skilled in the art to which the invention appertains to construct and use the same.

My invention relates to an automobile thief alarm.

The object of my invention is to provide a device so constructed, that when the emergency brake-lever of an automobile is released after being set, by an unauthorized person, the ignition system will be rendered inoperative causing the motor to stop running, cause an audible signal or signals to be sounded until an authorized person resets the emergency brake-lever and releases the circuit forming and signal actuating means.

A further object of the invention is to provide simple and efficient means whereby the circuit forming means and signals may be rendered operative or inoperative.

A further object of the invention is to provide simple means whereby the circuit forming means, and signal actuating means will be locked against further movement after the emergency brake-lever has been released by an unauthorized person so that the audible signals will operate continuously and further render the ignition system inoperative, no matter how much the emergency brake-lever is actuated by the unauthorized person.

A further object of the invention is to provide means whereby the circuit forming means and signal actuating means may be adjusted to any secret working combination to render either actuating means operative or inoperative.

A still further object of the invention is to provide means for actuating an auxiliary signal, such as an electric bell or horn.

A still further object of the invention is to provide means for rendering a portion of the mechanism inoperative during the normal operation of the brake-lever.

A further object of the invention is to coöperate an alarm circuit with the ignition system of a vehicle in such a manner that upon a person attempting to energize the ignition system and move the car, who is not aware of the combination, will cause the alarm circuit to be closed giving an audible signal.

A still further object of the invention is to coöperate a mechanically actuated bell alarm with the ignition circuit and alarm circuit in such a manner that upon an unauthorized person attempting to energize the ignition system and move the car, the mechanically operated bell alarm will be sounded, the alarm circuit closed for giving an auxiliary alarm and simultaneously therewith short circuiting the ignition system causing the motor to stop running.

With the above and other objects in view, the invention consists in certain features of construction, combination and arrangement of parts as will be hereinafter fully described and claimed.

Referring to the accompanying drawings forming a part of this specification wherein like characters of reference denote similar parts throughout the several views:

Figure 1, is a plan view of improved automobile thief alarm shown connected to both a high tension magneto (high tension type of ignition) and to a battery and to a low tension magneto or (primary type of ignition).

Fig. 2, is a side elevation of my alarm mechanism and section of housing taken on line X—X of Fig. 1.

Fig. 3, is a detail of the sliding plunger and controller-arm, the latter in a position which, if not readjusted before attempting to start the motor will cause an alarm to be signaled and short-circuit the ignition system.

Fig. 4, is a plan view of the alarm mechanism, the controller-arm as shown in Fig. 3, being moved to assume an inclined position causing the alarm circuit to be closed, the mechanically operated bell to be rung, and further rendering the ignition system inoperative.

The electrical portions will now be described.

Referring to the drawings, and more particularly to Fig. 1, it will be seen that the reference character A designates a primary type of ignition system which includes the usual magneto 1, or battery 2, the coil 3 and the switch 4. 5 is a conductor leading from the dash-switch 4 to a resilient contact-strip 6.

7 represents a resilient contact-strip which leads to ground through conductor 8 at one end, or the downwardly and outwardly bent end 9 of contact-strip 7 at its opposite end. The contact-strips 6 and 7 are engaged with one another at their free ends by means of the terminal 10 which is preferably integral with contact-strip 6. Contact-strips 6 and 7 are shown in Fig. 1, in their normal position and when dash-switch 4 is closed, the circuit is closed, thus rendering the ignition system on battery or primary type of ignition system A operative, permitting the motor to run without giving a signal warning.

When running on primary type of ignition A, the closing of dash-switch 4 completes the circuit through the battery or magneto, the coil and switch, then through conductor 5, contact-strip 6 and contact-strip 7 to ground.

The reference character B designates a high-tension type of ignition which includes the usual magneto 8', dash-switch 9' and ground 10'. 11 represents a conductor leading from the magneto side of dash-switch 9 to the contact-strip 12. Contact-strip 12 is provided with a terminal 13 upon one side and provided with an insulated body 14 upon the other side.

When running on high-tension type of ignition, the dash-switch 9 is in open position, as shown in Fig. 1, and terminal 13 of contact-strip 12 disengaged from contact-strip 7 which leads to ground. When the dash-switch 9 is closed the circuit grounds through magneto and destroys ignition through ground 10, also when contact-strips 7 and 12 come into contact with one another through ground 8.

The reference character 15 designates a battery. 16 and 17 conductors leading from a suitable auxiliary signal, such as an electric-horn 18 to the contact-strips 19 and 20, respectively. Connected in series with the horn circuit is an audible signal, such as an electric-bell 21. Both signals may be sounded simultaneously if desired. When it is only desired to sound the horn 18, the switch 56 is turned to break the circuit to the bell 21. When the contact-strips 19 and 20 are open, as shown in Fig. 1, the signals are inoperative, but when contact-strips 19 and 20 are forced into engagement with one another the circuit is closed, thus sounding either or both of the signals 18 and 21.

Each of the contact-strips 6, 7, 11, 19 and of suitable insulated blocks 22. The contact-strips and blocks 22 are held in a fixed position by any well known means such as bolts, rivets, or the like.

The mechanical portion of the invention will now be described.

The reference character 23 designates a suitable, preferably metallic casing or housing which may be provided with a hinged cover or door and provided with a suitable lock, if desired. The housing 23 is preferably attached to any convenient portion of the automobile, preferably to the underside of the floor, by means of any well known fastening means such as screws.

Adapted to be suitably placed and secured within the housing 23 is the mechanical portion of my invention, which consists of a suitably perforated top plate 24 and a lower plate 25. These plates are suitably spaced apart by means of the corner spacing blocks 26, 27, and 28 and the intermediate spacing blocks 29 and 30. By this arrangement it will be seen that I provide an opening between blocks 26 and 27 and between blocks 28 and 29 for the plunger 31 to slide through. There is also an opening provided between blocks 29 and 30 for the controller-arm 32 to pass through and to keep it from lateral movement at this end. The other end of the controller-arm 32 is free to have arcuate movement as there is no corner spacing block to prevent same.

Plunger 31 is provided upon one of its side faces with a suitable cam-surface 33. It is also provided with the stop-pins 34. A suitable spring member 35 is employed to normally hold the plunger 31 in the position shown in Fig. 1. One end of the spring member 35 is secured to the bottom plate 25 while the opposite end is secured to the plunger 31. I removably attach to the post 36 the flexible element or cable 37. This cable 37 is in turn preferably connected to the emergency brake-lever 38 of an automobile. The lever 38 and cable 37 move the plunger 31 in one direction and that when being set. The spring 35 moves the plunger in the opposite direction when the lever 38 is released.

Pivoted by means of the pin 39 intermediate the plunger 31 and the controller-arm 32 is an arm 40 having the bent end 41. The bent end is adapted when in its normal position as shown in Fig. 1, to be seated in the cutaway portion or notch 42 of the controller-arm 32. The arm 40 is held in its depressed position by means of the cam-surface 33, as clearly shown in Fig. 1. A suitable spring member 43 is employed to retract or remove the end 41 of arm 40 from the notch 42 of the controller-arm 32. One end of the spring 43 is connected to the arm 40 while the opposite end is connected to the bottom plate 25.

The means for longitudinally adjusting the controller-arm 32, to change the location of the notch 42 with relation to the bent end 41 of arm 40, consists of a suitable wire 44 removably attached to the post 45, which post is secured to the controller-arm 32. The wire 44 is adapted to pass through a flexible-cable 46 and the wire is connected at its opposite end to a suitable quadrant-lever 47. The cable 46 is held from movement by means of the set-screw 48. The object of moving the notch 42 out of registering relation with the bent end 41 of arm 40 will be clearly set forth hereinafter.

A suitable resilient keeper 49 is secured to the top plate 24 and is provided with a downwardly and outwardly bent lip 50. It is also provided with the upwardly extending ear 51. The lip 50 is adapted to engage one of the side faces of the controller-arm 32 when it has been moved to the inclined position shown in Fig. 4. The lip 50 is adapted to hold and lock the controller-arm 32 in this position until the cord or cable 52 has been pulled to release the lip 50 from engagement with the side face of the controller-arm 32. When the lip 50 has been released therefrom, the lip 9 of the resilient contact-strip 7 will force the controller-arm back to its normal position, as clearly shown in Fig. 1.

Arranged adjacent the above described mechanical mechanism in the housing 23 is a suitable mechanical operated bell 53 having the bell actuating arm 54. Pivotally connected with the arm 54 is a bell actuating push-rod 55. The opposite end of this push-rod 55 is adapted to engage the outer side face of the controller-arm 32, and when in its normal position is as shown in Fig. 1. When the controller-arm 32 is forced into arcuate movement to assume the inclined position shown in Fig. 4, the push-rod 55 is also moved thereby and in turn moves the actuating-arm 54 which releases the bell mechanism causing the same to ring continuously until released by pulling the brake-lever to braking position, adjusting controller-arm 32 until notch 42 registers with the bent end 41 of arm 40 and finally pulling cord 52 releasing the lip 50 of keeper 49 from engagement with the inside face of the controller-arm 32, thereby allowing the controller-arm to return to its normal position, which also permits the push-rod 55 to return to its normal position and discontinue the ringing of the bell 53.

From the foregoing description, it will be seen that as long as the notch 42 of the controller-arm 32 is in registered relation with the bent-end 41 of arm 40, the plunger 31 may be reciprocated without rendering the ignition system inoperative. The audible signals however, under these circumstances, it will be observed are rendered inoperative.

Upon leaving the vehicle the operator first sets the brake-lever 38 causing the plunger 31 to assume the position shown in Fig. 3. Second, the controller-arm 32 is moved so that the notch 42 is out of register with the bent-end 41 of arm 40.

Now upon an unauthorized person attempting to start the car, he must first release the brake-lever 38 and in doing so, if he is not aware of the combination in which to adjust the controller-arm, the cam-surface 33 in depressing the arm 40, will cause the bent-end 41 thereof to strike the controller-arm 32 instead of seating itself in the notch 42 thereof, thereby causing the controller-arm 32 to be swung until it assumes the inclined position shown in Fig. 4, when it is then automatically locked in said position by means of the lip 50 of the keeper 49.

The following takes place immediately upon the controller-arm 32 being locked in its inclined position.

The bell 53 is rendered operative through the push-rod 55 and bell actuating arm 54.

The alarm circuit, if employed, is closed through the contact-strips 19 and 20 by reason of their being forced into contact with one another through the lip 9 of contact-strip 7 coming in contact with the side face of the controller-arm 32, as clearly shown in Fig. 4.

If a primary type of ignition is employed, the ignition system is open circuited by reason of the contact-strips 6 and 7 being separated and disengaged from one another at their free ends.

And if a high-tension type of ignition is employed, the ignition system will be short circuited by reason of the contact-strips 7 and 12 being engaged with one another with their free ends which grounds the magneto through contact-strips 7 and 12 to ground 8.

It will be readily seen that my invention is adaptable to any form of ignition system, that it is simple in construction, efficient in operation, and capable of giving one or more audible signals besides rendering the ignition system inoperative upon attempted use of the vehicle by unauthorized persons.

The many advantages of the herein described invention, will readily suggest themselves to those skilled in the art to which the invention relates.

What I claim is:

1. In combination with an ignition system, a longitudinally adjustable and arcuately movable controller-arm, means coöperating with said arm for short circuiting the ignition system, and means coöperating with said arm for sounding an alarm, said first and second means acting simultaneously.

2. In combination with an ignition system, a longitudinally adjustable and arcuately movable controller-arm adapted upon arcuate movement to short-circuit the ignition system, and means cooperating with said arm for sounding an alarm.

3. In combination with an ignition system, a longitudinally adjustable and arcuately movable controller-arm, means cooperating with said arm for short circuiting the ignition system, means cooperating with said arm for sounding an alarm, and slidable means for imparting arcuate movement to said arm.

4. In combination with an ignition system, a longitudinally adjustable and arcuately movable controller-arm, means cooperating with said arm for short circuiting the ignition system, means cooperating with said arm for sounding a mechanically actuated alarm, means cooperating with said arm for sounding an auxiliary electric alarm, and slidable means for imparting arcuate movement to said arm.

5. In combination with an ignition system, an audible alarm circuit, a longitudinally adjustable and arcuately movable controller-arm adapted when moved to simultaneously short-circuit the ignition system and close said alarm circuit.

6. In combination with an ignition system, an alarm circuit, a longitudinally adjustable and arcuately movable controller-arm adapted when moved sufficiently to simultaneously short circuit the ignition system and close said alarm circuit, and means for imparting an arcuate movement to said controller-arm.

7. In combination with an ignition system, a plunger, a longitudinally adjustable and arcuately movable controller-arm adapted when in its normal position to render the ignition system operative, and when in a predetermined adjusted position to break the circuit of the ignition system, means for giving an arcuate movement to said controller-arm upon movement of said plunger in one direction, an alarm circuit adapted to be closed by said controller arm simultaneously with the arcuate movement thereof, and means cooperating with said controller-arm to sound a mechanically actuated audible alarm simultaneously with the arcuate movement of said controller-arm.

8. In combination, an ignition system, a brake-lever, an alarm circuit, a longitudinally adjustable and arcuately movable controller-arm adapted when in its normal position to render the ignition system operative, and means adapted to impart an arcuate movement to said controller arm by releasing the brake lever when the controller arm is adjusted to a pre-determined signaling position thereby rendering the ignition system inoperative, and means for closing the alarm circuit simultaneously with the arcuate movement of said controller arm for sounding an audible alarm.

9. In combination, an ignition system, a brake-lever, a plunger, an alarm circuit, a longitudinally adjustable and arcuately movable controller-arm adapted when in its normal position to render the ignition system operative, and when in any other adjusted position to render the ignition system inoperative upon the arcuate movement of the controller-arm and to close the alarm circuit simultaneously therewith, means cooperating with said controller-arm to simultaneously sound an alarm with the arcuate movement of said arm, and a cam-surface integral with said plunger under the control of said brake-lever for imparting arcuate movement to said controller-arm.

10. In combination, an ignition system, a lever, an alarm circuit, a longitudinally adjustable and arcuately movable controller-arm adapted when in its normal position to render the ignition system operative, and to short circuit said ignition system upon the arcuate movement of said controller-arm, means cooperating with said controller-arm for sounding an alarm, a plunger under the control of said lever for giving arcuate movement to said controller-arm and closing said alarm circuit.

11. In an alarm device, a longitudinally adjustable and arcuately movable controller-arm, means under the control of said arm for sounding an audible signal, a slidably mounted plunger, means for imparting a sliding movement to said plunger, means to permit the sliding movement of said plunger without imparting arcuate movement to said controller-arm, means adapted to impart an arcuate movement to said controller-arm when the sliding plunger is moved toward its normal position, and means for locking said arm in its moved position.

12. In an alarm device, an ignition system, a longitudinally adjustable and arcuately movable controller-arm, means under the control of said arm for sounding an audible signal, means under the control of said arm for sounding an auxiliary signal, a slidably mounted plunger, a pivoted arm arranged intermediate said controller-arm and said plunger, a cam integral with said plunger adapted to move in a position to depress said pivoted arm, means for adjusting said controller-arm to permit the arcuate movement thereof to sound the alarms and render the ignition system inoperative, means to prevent the arcuate movement of said controller-arm with the depressed movement of said pivoted-arm, and means for sliding said plunger.

13. In an alarm device, an ignition system, a longitudinally adjustable and arcuately movable controller-arm provided with a cut-away portion, means under the control of said controller-arm for sounding an audible signal, a slidably mounted plunger, an arm pivoted intermediate said controller-arm and said plunger, a cam adapted to move in a position to depress said pivoted-arm to either render said controller-arm non-movable or impart arcuate movement thereto, and a lever having connection with said plunger for imparting movement in one direction to said plunger.

In testimony whereof I hereunto affix my signature in the presence of two subscribing witnesses.

WILLIAM H. HANSSEN.

Witnesses:
   V. J. SCHOLTZ,
   BARNWELL S. STUART.